United States Patent [19]
Yung

[11] Patent Number: 5,794,521
[45] Date of Patent: Aug. 18, 1998

[54] BREADMAKER AND A CODING SYSTEM THEREFOR

[76] Inventor: Simon K. C. Yung, 6 Purves Road, Jardine's Lookout, Hong Kong

[21] Appl. No.: 915,654

[22] Filed: Aug. 21, 1997

Related U.S. Application Data

[63] Continuation of Ser. No. 346,432, Nov. 29, 1994, Pat. No. 5,704,277.

[51] Int. Cl.$^6$ .............................. A21B 1/00; A21D 8/00; A47J 27/00; A47J 37/01
[52] U.S. Cl. .............................. 99/327; 99/348; 99/468; 366/144; 366/146; 366/314
[58] Field of Search .................. 99/325–328, 331–335, 99/348, 467, 468, 483, 484, 486; 366/69, 96–98, 144–146, 149, 341, 314, 601; 364/400; 426/18, 27, 87, 112, 113, 231, 233, 242, 243, 465, 504, 512, 516

[56] References Cited

U.S. PATENT DOCUMENTS

| | | | |
|---|---|---|---|
| 4,234,605 | 11/1980 | Takeuchi | 426/18 |
| 4,550,653 | 11/1985 | Hedenberg | 99/348 |
| 4,781,933 | 11/1988 | Fraioli | 426/242 |
| 4,803,086 | 2/1989 | Hedenberg | 426/87 |
| 4,984,512 | 1/1991 | Takahashi et al. | 99/327 |
| 5,076,153 | 12/1991 | Takahashi et al. | 99/327 |
| 5,280,150 | 1/1994 | Arai et al. | 99/348 X |
| 5,392,695 | 2/1995 | Junkel | 99/328 |
| 5,415,081 | 5/1995 | Yoshida et al. | 99/326 |
| 5,421,713 | 6/1995 | Backus et al. | 99/348 X |
| 5,433,139 | 7/1995 | Kitagawa et al. | 99/327 |
| 5,445,061 | 8/1995 | Barradas | 99/340 |

Primary Examiner—Timothy F. Simone
Attorney, Agent, or Firm—Majestic, Parsons, Siebert & Hsue

[57] ABSTRACT

An improved breadmaker not only has a baking pan placed inside a baking chamber above a heater but also a centrifugal fan for pushing air upward therethrough. A partition wall with upper and lower openings separates the fan from the baking pan such that the upwardly pushed hot air is caused to flow downward around the baking pan. The baking pan is thereby heated uniformly and heat energy is efficiently utilized. Many processing programs are stored for producing different kinds of bread by using different ingredients. Each processing program is assigned a code and can be selected by specifying the code associated with it from a control panel. Ingredients to be used in each of the programs may be in a premixed form in a package.

13 Claims, 3 Drawing Sheets

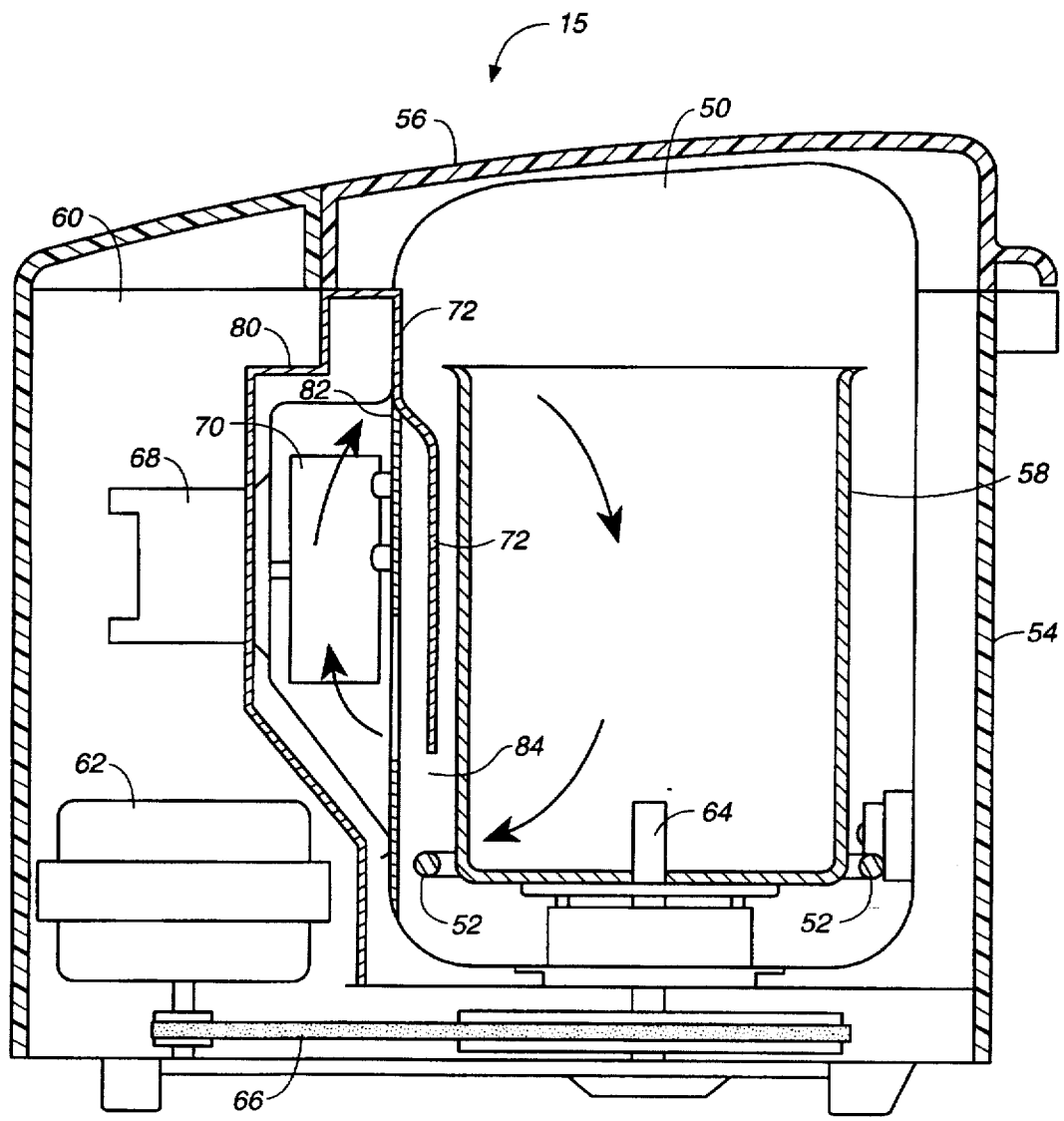
FIG._1

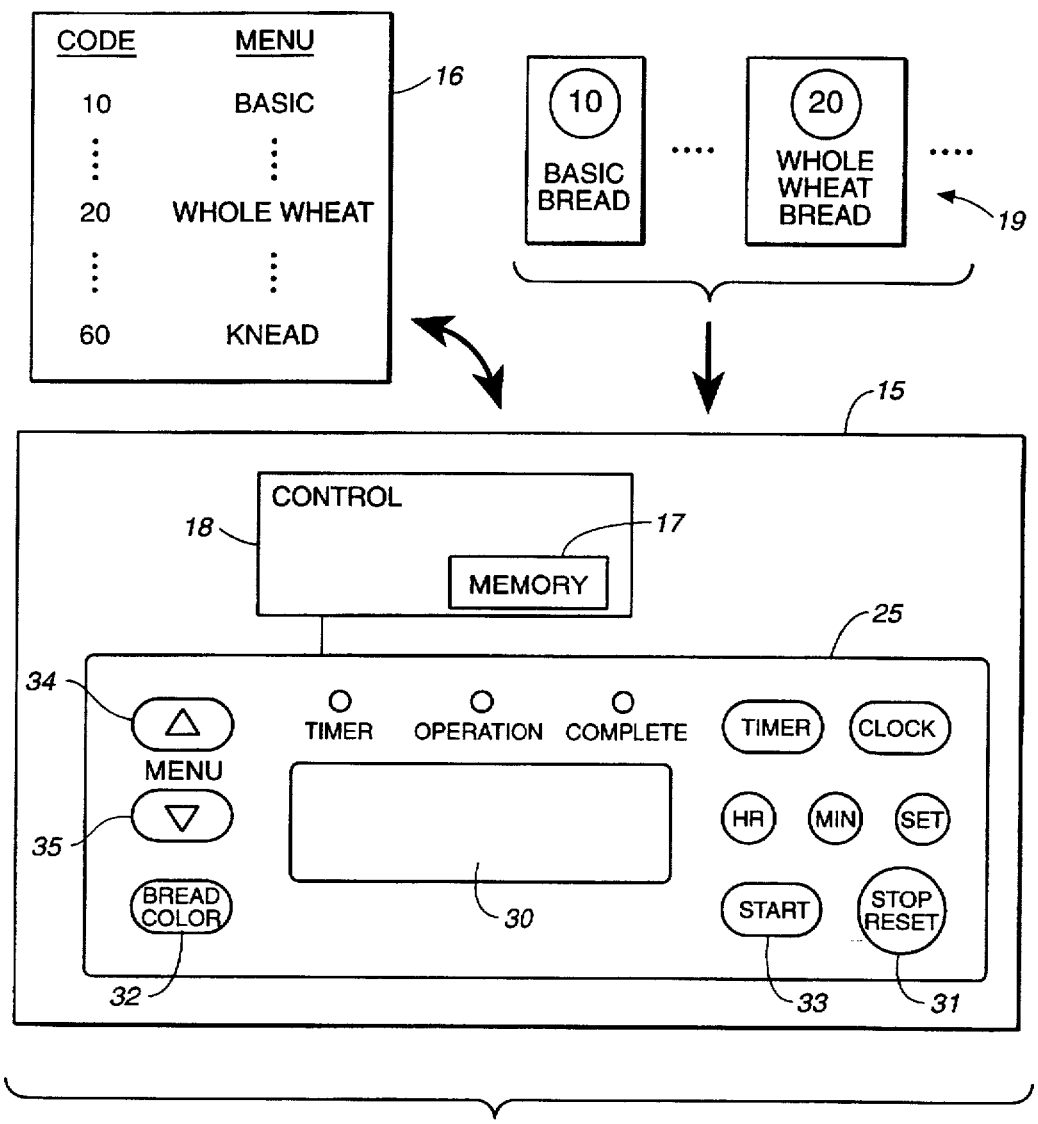
FIG._2
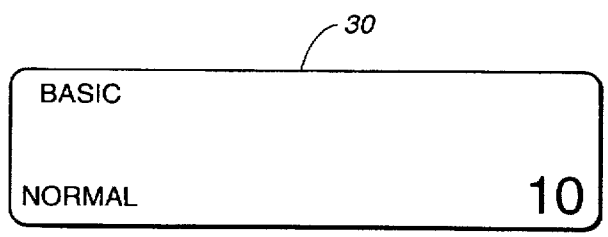
FIG._4

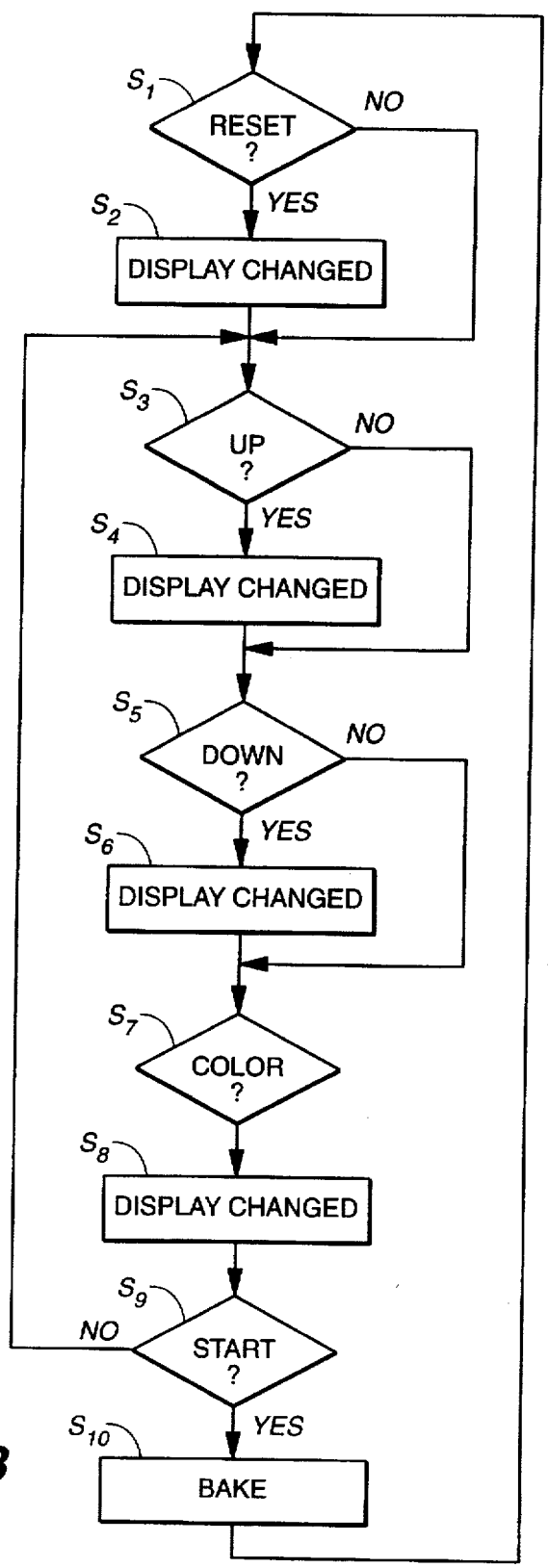
FIG._3

BREADMAKER AND A CODING SYSTEM THEREFOR

This is a continuation of application Ser. No. 08/346,432, filed Nov. 29, 1994 now U.S. Pat. No. 5,704,277.

BACKGROUND OF THE INVENTION

This invention relates to an improved breadmaker and a coding system for such a breadmaker or a program-controlled machine of a similar kind adapted to operate according to specified one of a plurality of provided programs by receiving materials required in the specified program such as ingredients of a selected kind of bread to be baked.

Breadmakers of the type comprising a baking chamber containing an electric heater at the bottom, a baking pan which is a container to be set inside the baking chamber for receiving ingredients therein, a stirrer for stirring and kneading the ingredients inside the baking pan and a motor for rotating the stirrer in a specified manner, have been known. With prior art breadmakers of this type, the air inside the baking chamber is heated by the heater at the bottom and, after it rises inside the baking chamber, allowed to be discharged from the baking chamber. In other words, generated heat was not effectively utilized by such prior art breadmakers.

Breadmakers of the type storing a plurality of programs and allowing a user to select one of them for baking a desired kind of bread have also been known. These programs generally include many complicated steps such as mixing selected ingredients and controlling the baking temperature. With some prior art breadmakers, the user is required to read a cookbook carefully to ascertain the necessary steps before setting an appropriate program. Some breadmakers are preprogrammed, and the user has only to specify the desired kind of bread to be baked, the breadmaker automatically carrying out the program associated with the specified kind of bread. For allowing the user to specify the kind of bread to be baked, some breadmakers are designed to display, as power is switched on, the types of bread that can be specified. An indicator is initially displayed at a default position, say, next to the name of the most commonly selected kind of bread, and the user operates a SELECT button until the indicator moves one position at a time to finally reach a position next to the desired kind of bread. Alternatively, the breadmaker may be provided with as many push buttons as the number of different kinds of bread that can be baked thereby, and the user is required to push the button corresponding to the desired kind of bread. With prior art breadmakers, therefore, the number of programs from which the user can select one is limited because the screen of the display device is not large and the control panel of the machine cannot accommodate too many buttons. With prior art breadmakers, furthermore, the user must carefully add the required ingredients such as flour, sugar, salt and yeast. In other words, prior art breadmakers are not energy-efficient and are difficult to use and the choice of different kinds of bread that can be baked thereby cannot be increased significantly.

SUMMARY OF THE INVENTION

It is therefore an object of the invention to provide bread makers generally of the type described above which, however, use the generated heat more efficiently.

It is another object of the invention to provide a new coding system for a program-controlled machine such as a breadmaker which allows a user to select one from a larger number of different kinds of product and to cause the machine to operate automatically on a program appropriate for the selected product.

It is still another object of the invention to provide such a coding system with which the user is less likely to make an error in providing ingredients for the specified product.

It is still another object of the invention to provide a cooking machine such as a breadmaker equipped with such an improved coding system.

An improved breadmaker embodying the present invention, with which the above and other objects can be achieved, may be characterized as being like a prior art breadmaker comprising a baking chamber having a heater therein, a baking pan adapted to receive ingredients therein and be set inside the baking chamber, a stirrer for stirring and kneading the ingredient inside the baking pan and a motor for rotating the stirrer in a specified manner, and also comprising an air-circulating means such as a centrifugal fan for causing the air inside the baking chamber to move upward through the fan and to circulate downward around the baking pan.

A coding system embodying the invention, with which the above and other objects can be accomplished, may be characterized as being associated with a machine adapted to carry out selectively any of a plurality of tasks according to a program and by using specific materials both associated with the selected task. An example of such machine is a breadmaker programmed to make different kinds of bread by using different mixtures of ingredients. Each of the products that can be obtained by such a machine is assigned a different code, and a table, serving as an indexing means, is provided to show what code has been assigned to each of the products that can be made or processed by the machine, and a user specifies the product to be obtained or processed by inputting the corresponding code. The materials to be used by the machine for making a product of the specified kind or carrying out a specified process may be provided in the form of a premixed package with the corresponding code clearly printed thereon such that the user is spared of the trouble of mixing the required ingredients himself/herself. The user may specify the code corresponding to the desired product by directly forming it on numeric or alphanumeric keys, or by causing available codes to appear sequentially on a display device one by one and pressing a process-starting button when the code corresponding to the desired product or process is displayed.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a sectional side view of a breadmaker embodying the present invention;

FIG. 2 is a schematic of a coding system embodying the invention as incorporated in a breadmaker;

FIG. 3 is a flow chart of the operation by the control means for the coding system of FIG. 2; and FIG. 4 is an example of display on the display device of FIG. 2 after reset.

DETAILED DESCRIPTION OF THE INVENTION

FIG. 1 shows a breadmaker 15 embodying the present invention, including components which are commonly known with reference to prior art breadmakers of a similar type. A baking chamber 50 containing an electric heater 52 near the bottom is formed inside a housing structure 54. The housing structure 54 is provided with a lid 56 which can be opened such that a baking pan 58 for receiving bread ingredients therein can be removably set inside the baking chamber 50. Adjacent to but separated by a chamber-separating wall 80 from the baking chamber 50 inside the housing structure 54, there is a motor chamber 60 containing a stirrer motor 62, of which the drive shaft is in motion-communicating relationship with a stirrer drive shaft 64 through a belt 66 such that stirrer blades (not shown) attached to the stirrer drive shaft 64 for stirring, kneading and mixing the contents of the baking pan 58 can be rotated in a specified manner, such as alternately in the clockwise and counter-clockwise directions, by activating the stirrer motor 62 in a controlled manner.

The motor chamber 60 further contains therein a fan motor 68 for a centrifugal fan 70 which is inside the baking chamber 50 but is separated from the baking pan 58 by a partition wall 72. The partition wall 72 has upper windows 82 above the centrifugal fan 70 and a lower inlet 84 below the centrifugal fan 70 such that, when the fan motor 68 activates the centrifugal fan 70, the air which has been heated by the heater 52 is forced upward therethrough as shown by upwardly pointing arrows in FIG. 1 through the space between the partition wall 72 and the chamber-separating wall separating the baking chamber 50 from the motor chamber 60. The upwardly pushed hot air is forced to pass through the upper windows 82 towards the baking pan 58, flows downward around the baking pan 58 as shown by downwardly pointing arrows in FIG. 1 and is then sucked through the lower inlet 84 towards the centrifugal fan 70. Thus, the heated air inside the baking chamber 50 is caused to circulate therein as shown by the arrows in FIG. 1 around the baking pan 58, instead of becoming discharged out of the baking chamber 50 as was the situation with prior art breadmakers of this type. As a result, heat is more efficiently utilized through convection by a breadmaker embodying the present invention such that up to 2.0 lbs of wheat bread and up to 2.5 lbs of white bread can be baked with the amount of energy required to bake about 1.5 lbs of bread by a prior art bread maker of a comparable design. Because the forced air circulation according to the present invention has the favorable effect of making temperature distribution uniform through the baking pan 58, furthermore, tastier bread with improved texture can be obtained.

A coding system according to the present invention will be described next as applied to a breadmaker such as the one described above with reference to FIG. 1, but it is applicable equally well to many other kinds of program-controlled machines adapted to operate according to any one of a plurality of programs which may each be associated with a different kind of product such as bread by receiving materials such as ingredients required in the selected program.

FIG. 2 shows the breadmaker 15 schematically as incorporating a coding system according to this invention, including a table 16, a memory device 17 which stores many programs and may be considered a part of a central processing unit 18 serving as control means for controlling the general operation of the breadmaker 15 as a whole by following any of these programs, and a control panel 25 provided with a display device 30 such as a liquid crystal display and many switches and buttons as input devices including a STOP/RESET button 31, a COLOR button 32 for choosing between normal and light bread coloring, and a START button 33 for starting a cycle of baking operations according to a selected program. An important feature of the invention is that the kinds of bread which can be baked or the processes which can be carried out by the breadmaker 15 are each assigned a code, which is preferably numeric, but may also be alphabetic or alphanumeric. As a practical example, numerical codes "10", "20" and "60" are assigned to represent not only "basic bread", "whole wheat bread" and a process of "kneading", respectively, but also the corresponding programs stored in the memory device 17 and intended to be called through the control means 18 to control the operation of the breadmaker 15 for baking basic bread, baking whole wheat bread and carrying out a predefined kneading process, respectively.

The table 16 is for showing to a user what code has been assigned to each kind of bread or process that can be selected, for example, by listing in one column all the codes which can be specified and in another column the kinds of bread and processes corresponding to the codes in the first column.

According to a preferred method of using the coding system described above, ingredients to be used for making each kind of bread listed in the table 16 are made available in a premixed form in a package as schematically shown at 19. Each package is clearly marked with the code representing the kind of bread to be baked or process to be carried out, that is, the program to be followed by the control means 18. This method is advantageous because the possibility of making errors by the user can be reduced when ingredients are poured into the baking pan 58 of the breadmaker 15, and the user is spared of the trouble of preparing a required mixture of ingredients.

Next, the process of selecting a kind of bread to be baked or a process to be carried out and specifying it by a code to the control means 18 will be described with referenced to the flow chart of FIG. 3 as well as the schematic of FIG. 2.

According to most practical embodiments of the invention, the program which is used most frequently, or believed to be used most frequently, is treated as the default program. Since the basic kind of bread with normal coloring is usually selected most frequently, the program for baking the basic bread is defined as the default program such that, when the STOP/RESET button 31 is pressed to reset the control means 18 (YES in Step S1), the code "10" corresponding to BASIC BREAD is automatically selected. Thus, after a reset, the display on the display device 30 will be as shown in FIG. 4 (Step S2).

The control panel 25 is provided with an UP button 34 and a DOWN button 35 for changing the specified program. The codes which are assigned to different kinds of bread and processes are arranged in a sequence (in an ascending order, for example, if the codes are numeric) such that, whenever the UP button 34 or the DOWN button 35 is pressed (YES in Step S3 or S5), the control means 18 selects the program corresponding to the next code in the sequence in the forward or backward direction, respectively, and causes the new code corresponding to the newly selected program to be displayed on the display device 30, as well as the name of the corresponding kind of bread or process selected (Step S4 or S6). Similarly, if the COLOR button is pressed (YES in Step S7), the selected color changes from normal to light or from light to normal, and the display on the display device 30 also changes from NORMAL to LIGHT, or from LIGHT to NORMAL (Step S8). When one of the codes and the bread color (normal or light) have been selected and the START button 33 is pressed (YES in Step S9), the control means 18 begins to operate the breadmaker 15 according to the selected one of the stored programs (Step S10).

As shown in FIG. 2, the control panel 25 is further provided with a timer button (TIMER) for entering the timer setting mode of operation to set a timer (not shown), a clock button (CLOCK) for entering the clock setting mode of operation to set a clock (not shown), an hour button (HR) and a minute button (MIN) for respectively setting the hour and the minute in the timer and clock setting modes, and a set button (SET) for setting the timer or the clock, as well as light emitting diodes marked TIMER, OPERATION and COMPLETE to show respectively that the control is in the timer setting mode, that the baking operation is going on and that the baking operation has been completed. These and similar kinds of buttons and diodes have been in use with prior art breadmakers, and their functions are well known by the users. Thus, they are illustrated in FIG. 2 but will not be described in any detail herein.

The present invention was described above with reference to only a few examples. These examples are intended to be merely illustrative, however, and not limitative. Many modifications and variations are possible on the disclosed examples. For example, the coding system of the present invention need not relate to a breadmaker, or more generally to a cooking machine, but also to any program-controlled machine allowing a user to select one of a plurality of programs and operating on such a selected program by using a special material associated with the program. A particular coding method was illustrated above, but the codes need not necessarily be arranged in a sequence such that they appear in the display device one by one in that sequence, either in the forward or backward direction, to allow the user to decide whether or not to select the one of the choices being displayed. The control panel may be provided with numeric keys, or alphanumeric keys, to allow the user to form a numeric or alphanumeric code to directly call a desired program. In summary, any such modifications and variations that may be apparent to a person skilled in the art are intended to be within the scope of the invention.

What is claimed is:

1. An automatic breadmaker system, comprising:
   a package of ingredients for baking bread;
   a breadmaker for operating a preprogrammed process selectable from a repertoire of preprogrammed processes, said breadmaker further comprising:
   a baking pan for receiving said package of ingredients therein;
   an input for inputting a code to select a preprogrammed process among said repertoire of preprogrammed processes; and
   a controller responsive to said code for executing the selected preprogrammed process to process said package of ingredients in said baking pan; and wherein
   said package of ingredients further comprises a code corresponding to a preprogrammed process of said breadmaker among said repertoire of preprogrammed processes.

2. An automatic breadmaker system as in claim 1, wherein:
   said code has a format that includes numeric code; and
   said input comprises numeric keys for entering said code.

3. An automatic breadmaker system as in claim 1, wherein:
   said code has a format that includes alpha code; and
   said input comprises alpha keys for entering said code.

4. An automatic breadmaker system as in claim 1, wherein:
   said code has a format that includes alpha-numeric code and
   said input comprises alpha-numeric keys for entering said code.

5. An automatic breadmaker system as in one of claims 2-4, further comprising a display for displaying the input code.

6. An automatic breadmaker system as in claim 1, further comprising a table that corresponds a code to an associated descriptor.

7. An automatic breadmaker system as in claim 6, further comprising a display for displaying said code and said associated descriptor.

8. An automatic breadmaker system as in claim 1, further comprising:
   a display for displaying codes corresponding to said repertoire of preprogrammed processes.

9. An automatic breadmaker system as in claim 8, wherein said input comprises stepping buttons for stepping through the codes one-by-one.

10. An automatic breadmaker system as in claim 9, wherein said input comprises a select button for selecting one of the codes as it is being stepped through.

11. An automatic breadmaker system as in claim 1, wherein said breadmaker has one of a preprogrammed process among said repertoire of preprogrammed processes as a default process.

12. In an automatic breadmaker system including a breadmaker for operating a plurality of preprogrammed processes, said breadmaker further comprising a baking pan for receiving a package of ingredients therein, an input for inputting a code for designating one of said plurality of preprogrammed processes, and a controller responsive to said code for executing said designed one of said plurality of preprogrammed processes to process said package of ingredients in said baking pan, said automatic breadmaker system further including at least one of a plurality of packages of ingredients, wherein said at least one of a plurality of packages of ingredients comprises:
    a package of breadmix ingredients; and
    an indicia included with said package for indicating a code for designating an appropriate one of said plurality of preprogrammed processes operated by said automatic breadmaker, thereby allowing said code to be input to the breadmaker and for said breadmaker to execute the designated preprogrammed process appropriate for said package of breadmix ingredients.

13. An automatic cooking system, comprising:
    a package of ingredients for cooking;
    a cooking apparatus for operating a preprogrammed process selectable from a repertoire of preprogrammed processes, said cooking apparatus further comprising:
    a container for receiving said package of ingredients therein;
    an input for inputting a code to select a preprogrammed process among said repertoire of preprogrammed processes; and
    a controller responsive to said code for executing the selected preprogrammed process to process said package of ingredients in said container; and wherein
    said package of ingredients further comprises a code corresponding to a preprogrammed process of said cooking apparatus among said repertoire of preprogrammed processes.

* * * * *